United States Patent [19]

Johnston

[11] Patent Number: 4,747,064

[45] Date of Patent: May 24, 1988

[54] APPROACHING VEHICLE INFORMING SYSTEM AND METHOD

[76] Inventor: Robert D. Johnston, 431 Thorne Dr., Brownsburg, Ind. 46112

[21] Appl. No.: 914,789

[22] Filed: Oct. 3, 1986

Related U.S. Application Data

[63] Continuation-in-part of Ser. No. 590,862, Mar. 19, 1984, abandoned.

[51] Int. Cl.⁴ .................. G06F 15/20; G01C 15/20
[52] U.S. Cl. .................. 364/569; 340/870.15; 340/902; 340/906; 364/460; 364/550
[58] Field of Search .............. 340/870.05, 870.15, 340/870.41, 901, 902, 904, 906, 943; 364/424, 436, 550, 569, 460, 461; 367/902; 116/35 R

[56] References Cited

U.S. PATENT DOCUMENTS

| | | | |
|---|---|---|---|
| 3,566,348 | 2/1971 | Leyden et al. | 340/16 |
| 3,731,273 | 5/1973 | Hunt | 340/902 |
| 3,735,342 | 5/1973 | Helliker et al. | 340/902 |
| 3,784,970 | 1/1974 | Simpkin | 340/33 |
| 3,796,864 | 3/1974 | Sampey | 340/902 |
| 3,873,963 | 3/1975 | Neal et al. | 340/902 |
| 4,075,892 | 2/1978 | Burckhardt | 73/509 |
| 4,095,551 | 6/1978 | Paul et al. | 73/509 |
| 4,238,778 | 12/1980 | Ohsumi | 340/902 |
| 4,380,004 | 4/1983 | Coats et al. | 340/902 |
| 4,468,746 | 8/1984 | Davis | 364/569 |
| 4,543,577 | 9/1985 | Tachibana et al. | 340/904 |
| 4,573,049 | 2/1986 | Obeck | 340/906 |
| 4,674,073 | 6/1987 | Naruse | 340/904 |

Primary Examiner—Parshotam S. Lall
Assistant Examiner—Kevin J. Teska
Attorney, Agent, or Firm—Craig A. Wood

[57] ABSTRACT

An approaching vehicle informing system and method for informing the driver of a vehicle of the presence of a relatively approaching emergency vehicle and providing the driver with information regarding the amount of time until vehicles meet. Included are a transmitting station for simultaneously emitting periodic electromagnetic and sound pulses of preselected frequencies located on the emergency vehicle, and a receiving station located on the driver's vehicle. The receiving station includes circuitry to receive the electromagnetic and sound pulses and discriminate signals of the preselected frequencies. A microcomputer is programmed to measure the time interval between simultaneously emitted electromagnetic and sound pulses, determines the Doppler frequency shift of the received sound pulse, and calculates the time until vehicles meet, which is displayed in numerical form to the driver in the event the Doppler frequency of received sound pulses exceeds the frequency of emitted sound pulses.

16 Claims, 1 Drawing Sheet

APPROACHING VEHICLE INFORMING SYSTEM AND METHOD

CROSS REFERENCE TO RELATED APPLICATION

This is a continuation-in-part of application Ser. No. 590,862, filed Mar. 19, 1984, now abandoned.

BACKGROUND OF THE INVENTION

1. Field of the Invention

The present invention relates to an informing system and method, and more particularly to an informing system and method utilizing electromagnetic and acoustic signals emitted from an approaching emergency vehicle or similar for providing a warning of the presence of and determining the time until metting with a stationary or moving receiver.

2. Description of the Prior Art

Acoustical sirens for signaling the presence of emergency vehicles were adopted over fifty years ago when the prevailing construction of motor vehicles afforded relatively easy access to such signals. Soundproofing provided by the current design of motor vehicles and the background noise of internal radios, heaters, air conditioners and other sound producing devices have greatly reduced the effectiveness of acoustical sirens for this use. In addition, hearing impaired drivers are put at risk whenever they are unable to see the flashing lights or similar from an emergency vehicle due to intervening objects. Various methods and systems have been proposed to inform the driver of a motor vehicle of the proximity of an emergency vehicle.

The system disclosed by U.S. Pat. Nos. 3,873,963 and 4,380,004 use acoustical signals emitted from an emergency vehicle to cause an alarm to be triggered inside a proximate motor vehicle, but do not provide the driver with information regarding the distance between vehicles or how long before the vehicles meet. The system disclosed by U.S. Pat. No. 4,238,778 uses electromagnetic signals emitted from an emergency vehicle to cause an alarm to be triggered inside a proximate motor vehicle, and gives the driver some indication of the relative distance between the vehicles by the use of a variable frequency audio alarm signal, but does not provide the driver with information regarding how long before the vehicles meet. The system disclosed by U.S. Pat. Nos. 3,566,348 and 3,731,273 use both acoustical and electromagnetic signals to determine the relative distance and direction of two objects, but do not provide information regarding how long before the objects, if moving, would meet. The system disclosed by U.S. Pat. No. 3,784,970 uses both electromagnetic and acoustical signals emitted from an emergency vehicle to cause an alarm to be activated inside a motor vehicle that is closer than a predetermined range, but does not provide the driver with any other information regarding the distance between the vehicles or how long before the vehicles meet.

Despite the availability of such systems, there exists a need in the art for an improved approaching vehicle informing system and method that informs the driver of a motor vehicle when a proximate emergency vehicle is relatively approaching, and, in addition, gives information to the driver as to the time until the emergency vehicle and the driver's vehicle meet, thereby permitting the driver to make an informed judgment as to the most appropriate action to take in view of the surrounding circumstances.

SUMMARY OF THE INVENTION

In order to aid in the understanding of the present invention, it can be stated in essentially summary form that it is directed to an approaching vehicle informing system and method that provides the driver of a motor vehicle with warning in the event of an approaching emergency vehicle and provides information as to the amount of time until the vehicles meet.

To this end, a transmitting station located on an approaching emergency vehicle has circuitry for simultaneously transmitting periodic pulsed electromagnetic waves in the radio regime and pulsed sound waves, each of a predetermined frequency. A receiving station located on a second vehicle includes circuity for receiving the radio frequency pulses and the sound pulses. A microcomputer responsive at the receiving station measures and stores a numerical value of the time interval between reception of simultaneously emitted radio and sound pulses, representing the distance between the vehicles in units of the speed of sound. The microcomputer also compares the frequency of the received sound pulses with a stored value of the frequency of the emitted sound pulses, and for values of the received sound frequency exceeding the stored frequency value, representing the relative approach of vehicles, calculates the relative speed of the approaching vehicles, in terms of the speed of sound, using the Doppler effect relationship. Knowledge of the relative distance and speed of the vehicles thereafter permits the microcomputer to calculate the time, in seconds, for the vehicles to meet. Responsive to the microcomputer are a light emitting diode for visually displaying the time until vehicles meet, and an audio, visual or vibratory alarm.

It is an object of the present invention to provide an approaching vehicle informing system and method that informs the driver of a vehicle of the presence of an approaching but not a receding emergency vehicle.

It is another object of the present invention to provide an approaching vehicle informing system and method that rapidly provides the driver of a vehicle with information regarding the amount of time until the vehicle and an approaching emergency vehicle meet.

It is still another object of the present invention to provide an approaching vehicle informing system and method that can automatically switch a traffic signal to a preselected display mode when an approaching but not receding emergency vehicle is proximate.

Further objects and advantages of the present invention will be apparent from a study of the following portion of the specification, the claims, and the attached drawings.

DESCRIPTION OF THE PREFERRED EMBODIMENTS

The following specifications, taken in conjunction with the drawings, sets forth the preferred embodiments of the present invention. The embodiments of the invention disclosed herein are the best mode contemplated by the inventor for carrying out his invention in a commercial environment, although it should be understood that various modifications can be accomplished within the parameters of the present invention.

Figure 1:
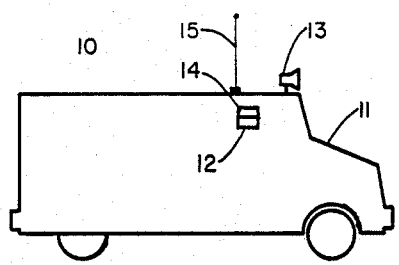
FIG. 1 is a side elevational view of an emergency vehicle illustrating, as mounted thereon, the transmitting station of the present invention.

Referring now to the drawings for a detailed description of the present invention, reference is made first to FIG. 1, showing transmitting station generally identified by numeral 10, located on emergency vehicle 11, having radio transmitter 14, capable of producing periodic pulsed electromagnetic oscillations of a first preselected frequency in the radio spectrum, is connected to transmitting antenna 15. Sound generator 12, capable of producing pulsed electrical signals of a second preselected frequency simultaneously with the pulsed electromagnetic oscillations of antenna 15, is electrically connected to horn 13 capable of producing periodic pulsed oscillations of the second preselected frequency in response to sound generator 12. Typically, the period between pulses of electromagnetic and acoustic oscillations will be one second.

Figure 2:
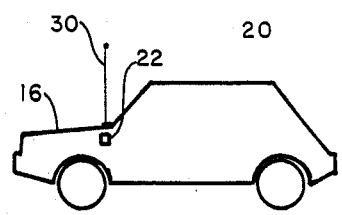
FIG. 2 is a side elevational view of a second vehicle illustrating, as mounted thereon, the receiving station of the present invention.

Referring to FIG. 2, receiving station is generally identified by numeral 20. Pulsed acoustic oscillations emitted by horn 13 are received by microphone 22 attached to vehicle 16. Receiving antenna 30 mounted on vehicle 16 receives pulsed electromagnetic oscillations emitted from transmitting antenna 15.

Two physical principles utilized during operation of the present invention are the difference in propagation speed of electromagnetic and acoustic disturbances in the atmosphere and the Doppler effect as applied to frequency changes of acoustic signals between a source and an observer relatively approaching. Regarding the former, as the speed of electromagnetic waves in the atmosphere is over five orders of magnitude greater than the speed of sound waves in the atmosphere, the time interval between the reception of a particular pulse of electromagnetic oscillations emitted by transmitting station 10 and the reception of a simultaneously emitted pulse of acoustic oscillations by receiving station 20, will, to a high degree of accuracy, be equivalent to the time interval for a pulse of acoustic oscillations to travel from transmitting station 10 to receiving station 20. Regarding the latter, the relationship between the frequency f of an acoustic signal emitted by a source and the frequency f' of the same signal as received by an observer when there is movement between source and observer at relative speed V is given approximately by the relation:

$$V = c(f'-f)/f'$$

where c denotes the speed of sound in the atmosphere and is much greater than relative speed V. Positive valves of relative speed V indicate relative approach of source and observer. Assuming relatively approaching source and observer each maintain constant velocity, the time until source and observer meet is given by the quotient of the distance between source and observer as numerator, and the relative speed of source and observer as denominator. As the distance between source and observer is given by the product of the speed of sound in the atmosphere, c, and the time interval for sound to travel from source to observer, the time until source and observer meet is given approximately by the relation:

$$T = (t)(f')/(f'-f)$$

where T is the time until source and observer meet and t is the time interval between reception by observer of a particular pulse of electromagnetic waves emitted by source and the reception by observer of a pulse of acoustic waves simultaneously emitted by source which, to a high degree of accuracy, is equivalent to the time interval for sound to travel from source to observer.

Figure 3:
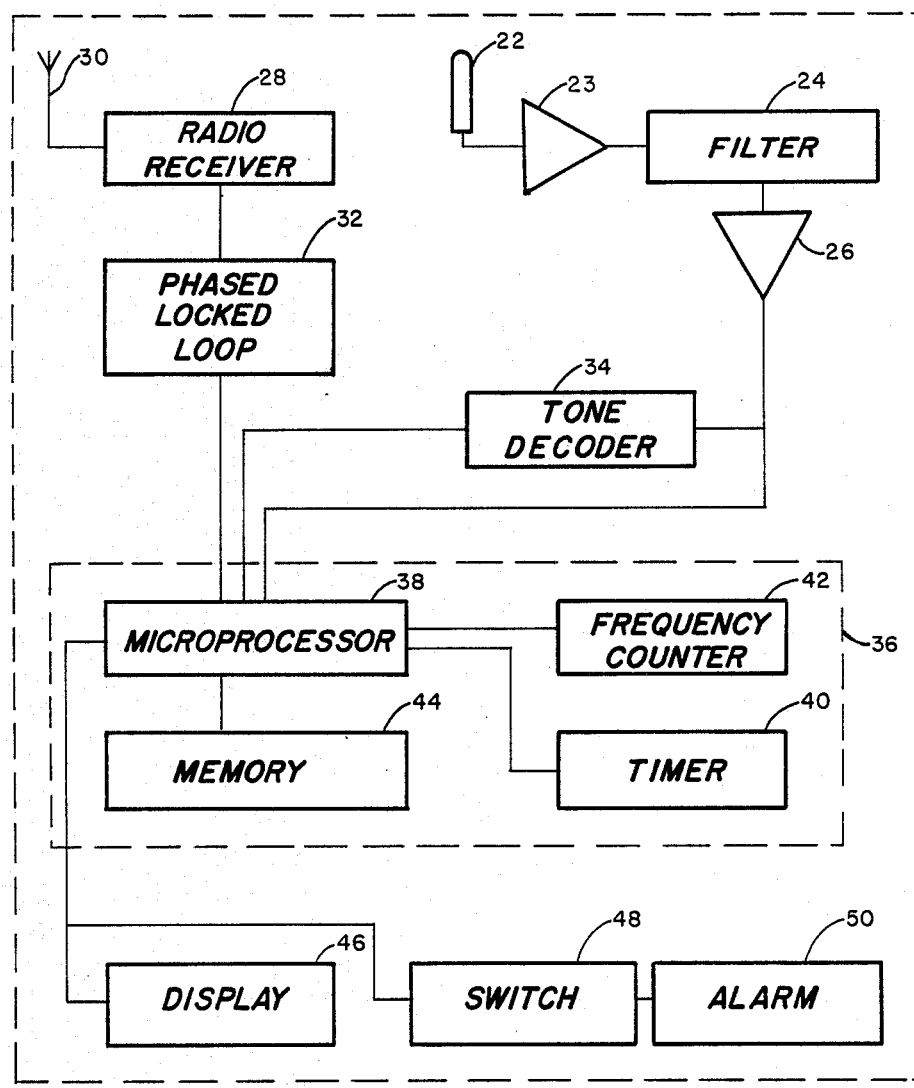
FIG. 3 is a block diagram of the receiving station of the present invention.

Referring now to FIG. 3, pulsed electromagnetic oscillations of said first preselected frequency emitted from transmitting station 10 enter radio receiver 28 through receiving antenna 30, and impress said first preselected frequency on integrated circuit phased locked loop 32 connected to the output of radio receiver 28. Under the influence of said first preselected frequency, the output of phased locked loop 32 goes to a low voltage state.

Also referring to FIG. 3, pulsed acoustic oscillations are received by microphone 22 and are converted to oscillating voltage that acts as input to preamplifier 23. The output of preamplifier 23 acts as input to bandpass filter 24, which passes only a range of frequencies near said second preselected frequency as emitted by horn 13. Amplifier 26 amplifies the output of bandpass filter 24. The input of integrated circuit tone decoder 34 is electrically connected to the output of amplifier 26, and the output of tone decoder 34 goes to a low voltage state in response to output from amplifier 26.

As shown in FIG. 3, a microcomputer is generally identified by numeral 36, having microprocessor 38 connected to timer 40, frequency counter 42 and memory 44. The output of phased locked loop 32, amplifier 26 and tone decoder 34 are connected as inputs to microcomputer 38, and display 46 and switch 48 are connected in parallel as outputs from microcomputer 36.

The design constants placed in permanent storage of memory 44 are a numerical value of said second preselected frequency of acoustic oscillations on Hertz, typically 5000, and a numerical value of a time period used to count frequency in frequency counter 42 in Hertz, typically 500, representing 0.1 second at 5000 Hertz. A numerical value, equal to said second preselected frequency of acoustic oscillations in Hertz is typically selected as the value of the frequency of an internal clock programmed into microcomputer 36. With design constants chosen in this manner, the numerical value of acoustic oscillations of said second preselected frequency transmitted in 0.1 second is equal to the numerical value of the time period used to count frequency, and thus can be represented by the numerical value of the time period used to count frequency. In a like manner, said second preselected frequency of acoustic oscillations is numerically equal to, and can thus represent, the frequency of said internal clock Microcomputer 36 is programmed to respond to said low voltage state of phased locked loop 32 by triggering a first interrupt and subsequently starting to count oscillations of said internal clock. The count of oscillations of said internal clock is made in timer 40, and continues to be made until the output of tone decoder 34 goes to a low voltage state in response to the arrival of pulsed acoustic oscillations at microphone 22. Microcomputer 36 is so programmed to respond to the low voltage state of the output of tone decoder 34 as a second interrupt, by stopping the count of oscillations of said internal clock, moving the count of oscillations made in timer 40 to memory 44, and clearing the register of timer 40. Next, microcomputer 36 is programmed to place the numerical value of the time period used to count frequency stored in memory 44 in the register of timer 40, and to cause frequency counter 42 to begin counting each oscillation of the voltage from amplifier 26, that is, each voltage oscillation induced by the acoustic oscillations at or near said first preselected frequency. Microcomputer 36 is programmed to decrement the numerical value of the time period used to count frequency at the oscillation rate of said internal clock. At the typical internal clock rate of 5000 Hertz, and the typical value of the time period used to count frequency of 500, decrementation will last for 0.1 second. Microcomputer 36 is programmed to test for a zero reading in the register of timer 40 following the placement of the value of the time period used to count frequency in the register of timer 40, and when the numerical value in timer 40 reaches zero, microcomputer 36 is programmed to stop counting oscillations of voltage from amplifier 26. Thereafter microcomputer 36 is programmed to compare the numerical value of the oscillations of voltage from amplifier 26 as present in frequency counter 42 with the numerical value of the time period stored in memory 44 and used to count frequency.

In the event the numerical value present in frequency counter 42 is less than or equal to the numerical value of the time period stored in memory 44, the physical relationship between emergency vehicle 11 and vehicle 16 is that of relative recession or comovemant, respectively, due to the Doppler effect. In this case, microcomputer 36 is programmed to discontinue processing, the numerical values present in the register of timer 40, frequency counter 42 and the count of oscillations stored in memory 44 are cleared, and microcomputer 36 returns to an idle condition awaiting first interrupt from phased locked loop 32. Thus, discrimination and rejection of Doppler frequencies not in excess of said second preselected frequency of acoustic oscillations is accomplished.

In the event the numerical value present in frequency counter 42 is greater than the numerical value of the time period stored in memory 44, the physical relationship between emergency vehicle 11 and vehicle 16 is that of relative approach. In this case, microcomputer 36 is programmed to use the Doppler relationship to calculate a numerical value, in seconds, for the time until emergency vehicle 10 and vehicle 16 meet assuming no changes in velocity, referred to as the time to meet. Microcomputer 36 is programmed to form a first quotient of the count of oscillations temporarily stored in memory 44 as numerator and the numerical value of said second preselected frequency of acoustic oscillations in the denominator, thereby yielding the time, in seconds, for a pulse of acoustic oscillations to travel from emergency vehicle 11 to vehicle 16, or equivalently, the distance between emergency vehicle 11 and vehicle 16 in units of the velocity of sound. Next, microcomputer 36 is programmed to form a second quotient of the numerical value present in frequency counter 42 as denominator and the difference between the numerical value present in frequency counter 42 and the numerical value of acoustic oscillations of said second preselected frequency transmitted in 0.1 second, as equal to the numerical value of the time period stored in memory 44 as numerator, thereby yielding the Doppler increase in frequency in units of the second preselected frequency of acoustic oscillations, or, equivalently, the relative velocity between emergency vehicle 11 and vehicle 16 in units of the velocity of sound. Microcomputer 36 then is programmed to form a third quotient of said first quotient as numerator and said second quotient as denominator, thus forming, in the same units, the distance between emergency vehicle 11 and vehicle 16 as numerator, so as to obtain a numerical value for the time to meet in seconds.

Microcomputer 36 is programmed to decode voltages representing binary coded decimal numbers and present the time to meet by way of display 46, typically as formed numbers in a seven-segment light emitting diode. Microcomputer 36 is also programmed to output a voltage to the control terminal of switch 48, normally in an open position, so as to cause switch 48 to close thereby activating an audible, visual or vibratory alarm 50 connected to the output of microcomputer 36 so as to quickly attract the attention of occupants of vehicle 16 to time sensitive information presented by display 46.

Following presentation of the time to meet at display 46, microcomputer 36 is programmed to clear the registers of counter 42 and timer 40 and the volatile memory of memory 44, and return to the beginning of programming to wait in an idle condition for a subsequent first interrupt from phased locked loop 32.

In another embodiment of the present invention not shown, receiving station 20 is mounted on a stationary traffic light. The output of microcomputer 36 is electrically connected to the switching circuitry of the traffic light and microcomputer 36 is programmed to activate the switching circuitry to display stop or caution indicators in all directions when the time to meet is less than a predetermined value stored in memory 44.

The present invention having been described in its preferred embodiments, it is clear that it is susceptible to numerous modifications and embodiments within the ability of those skilled in the art and without the exercise of the inventive faculty. Accordingly, the scope of the present invention is defined by the scope of the following claims.

What is claimed is:

1. Approaching vehicle informing system comprising:
    transmitting means for simultaneously transmitting a pulse of electromagnetic waves of a first frequency and a pulse of acoustic waves of a second frequency;
    receiving means, remotely located from said transmitting means, for receiving said pulses of electromagnetic and acoustic waves and including timing circuitry responsive to the time relationship in reception of said pulse of electromagnetic waves and said pulse of acoustic waves and including frequency circuitry responsive to the frequency of said pulse of acoustic waves as received to produce a message representing the amount of time until said transmitting means and said receiving means meet.

2. Approaching vehicle informing system as defined in claim 1, further comprising an alarm means for producing a warning signal, in response to the production of said message representing the amount of time until said transmitting means and said receiving means meet.

3. Approaching vehicle informing system as defined in claim 1, wherein said receiving means comprises:

receiver means for reception of said pulses of acoustic and electromagnetic waves;

timing means responsive to said receiver means for measuring the interval of time between reception of said pulse of electromagnetic waves and said pulse of acoustic waves by said receiver means and for generating an output signal representing the interval of time between reception of said pulse of electromagnetic waves and said pulse of acoustic waves;

counting means responsive to said receiver means for measuring the frequency of said pulse of acoustic waves as received by said receiver means and for generating an output signal representing the frequency of said pulse of acoustic waves as received;

comparing means responsive to the output signal of said counting means for measuring the increase of the frequency of said pulse of acoustic waves as received with respect to said second frequency and for generating an output signal representing the increase of the frequency of said pulse of acoustic waves as received with respect to said second frequency;

computing means responsive to the output signals of said timing means, said counting means and said comparing means for computing the amount of time until said transmitting means and said receiving means meet from the relation:

$$T=(t)(s)/(i)$$

wherein T is the amount of time until said transmitting means and said receiving means meet, t is the interval of time between reception of said pulse of electromagnetic waves and said pulse of acoustic wave, s is the frequency of said pulse of acoustic waves as received, and i is the increase of the frequency of said pulse of acoustic waves as received with respect to said second frequency, and for generating an output signal representing the amount of time until said transmitting means and said receiving means meet;

alarm means responsive to the output signal of said computing means for producing a warning signal; and display means responsive to the output signal of said computing means for producing a visual display of the amount of time until said transmitting means and said receiving means meet.

4. Approaching vehicle informing system comprising:

transmitting means for transmitting a sequence of simultaneous short pulses of electromagnetic waves of a first frequency and acoustic waves of a second frequency; and receiving means, remotely located from said transmitting means, for receiving pulses of said electromagnetic and acoustic waves and including timing circuitry responsive to the time relationship in reception of pulses of said electromagnetic waves and of simultaneously transmitted pulses of said acoustic waves, and including frequency circuitry responsive to the frequency of individual pulses of said acoustic waves as received, to produce a sequence of messages representing a sequence of values of the amount of time until said transmitting means and said receiving means meet.

5. Approaching vehicle informing system as defined in claim 4, further comprising an alarm means for producing a warning signal, in response to the production of the first of said sequence of messages representing said sequence of values of the amount of time until said transmitting means and said receiving means meet.

6. Approaching vehicle informing system as defined in claim 4, wherein said receiving means comprises:

receiver means for reception of pulses of said electromagnetic waves and acoustic waves;

timing means responsive to said receiver means for measuring the intervals of time between reception by said receiver means of the simultaneously transmitted pulses of said electromagnetic waves and acoustic waves and for generating a sequence of output signals representing said intervals of time between reception of the simultaneously transmitted pulses of said electromagnetic waves and acoustic waves;

counting means responsive to said receiver means for measuring the frequency of individual pulses of said acoustic waves as received by said receiver means and for generating a sequence of output signals representing the frequency of individual pulses of said acoustic waves as received;

comparing means responsive to the sequnce of output signals of said counting means for measuring the increase of the frequency of individual pulses of said acoustic waves as received with respect to said second frequency and for generating a sequence of output signals representing the increase of the frequency of individual pulses of said acoustic waves as received with respect to said second frequency;

computing means responsive to the sequences of output signals of said timing means, said counting means and said comparing means, for computing a sequence of values of the amount of time until said transmitting means of said receiving means meet, each of said values determined from the relation:

$$T=(t)(s)/(i)$$

wherein T is the value of the amount of time until said transmitting means and said receiving means meet, t is the interval of time between reception of a simultaneously transmitted pulse of said electromagnetic waves and a pulse of said acoustic waves, s is the frequency of a pulse of said acoustic waves as received, and i is the increase of the frequency of a pulse of said acoustic waves as received with respect to said second frequency, and for generating a sequence of output signals representing a sequence of values of the amount of time until said transmitting means and said receiving means meet;

alarm means responsive to the first of the sequence of output signals of said computing means for producing a warning signal; and display means responsive to the sequence of output signals of said computing means for producing a visual display of the sequence of values of the amount of time until said transmitting means and said receiving means meet.

7. Approaching vehicle informing system as defined in claim 3 or claim 6, wherein said receiver means comprises:

radio means for reception of electromagnetic waves and for generating an analogous output signal;

first decoding means for generating to said timing means a first timing signal, in response to frequency equivalence of said output signal of said radio means to said first frequency;

second decoding means for generating to said timing means a second timing signal, in response to a signal near said second frequency;

transducing means for receiving acoustic waves and for generating an analogous output signal; and filtering means responsive to the output signal of said transducing means for rejecting all frequencies outside of a band including said second frequency, and for generating an output signal to said counting means and an output signal to said second decoding means.

8. A method of informing as to the relative approach of a transmitter and a remotely located receiver comprising the steps of:

transmitting simultaneously a pulse of electromagnetic waves of a first frequency and a pulse of acoustic waves of a second frequency from said transmitter;

receiving said pulse of electromagnetic waves and said pulse of acoustic waves at said receiver;

measuring an interval of time between reception of said pulse of electromagnetic waves and said pulse of acoustic waves by said receiver to form a signal representing the interval of time;

counting the frequency of said pulse of acoustic waves as received by said receiver to form a signal representing the shifted frequency of said pulse of acoustic waves as received;

forming a difference representing the increase of the frequency of said pulse of acoustic waves as received with respect to said second frequency to form a signal representing the increase of the frequency of said pulse of acoustic waves as received with respect to said second frequency;

computing the amount of time until said transmitter and said receiver meet from the relation:

$$T=(t)(s)/(i)$$

wherein T is the amount of time until said transmitter and said receiver meet, t is the interval of time between reception of said pulse of electromagnetic waves and said pulse of acoustic waves, s is the frequency of said pulse of acoustic waves as received, and i is the increase of the frequency of said pulse of acoustic waves as received with respect to said second frequency, to form a signal representing the amount of time until said transmitter and said receiver meet; and displaying the amount of time until said transmitter and said receiver meet.

9. The method of claim 8 wherein the step of receiving said pulse of electromagnetic and said pulse of acoustic waves at said receiver comprises the steps of:

converting received electromagnetic waves to form an analogous first output signal;

processing said first output signal to form a first timing signal in response to frequency equivalence of said first output signal and said first frequency, said first timing signal representing the time of reception of said pulse of electromagnetic waves;

transducing received acoustic waves to form an analogous second output signal; and filtering said second output signal by rejecting all frequencies outside of a band including said second frequency, to form a frequency counting signal, and to form a second timing signal representing the time of reception of said pulse of acoustic waves.

10. The method of claim 8 or claim 9, further comprising the step of producing a warning signal essentially simultaneously with displaying the amount of time until said transmitter and said receiver meet.

11. A method of informing as to the relative approach of a transmitter and a remotely located receiver comprising the steps of:

transmitting a sequence of simultaneous short pulses of electromagnetic waves of a first frequency and acoustic waves of a second frequency from said transmitter;

receiving pulses of said electromagnetic waves and said acoustic waves at said receiver;

measuring a sequence of intervals of time between reception of simultaneously transmitted pulses of said electromagnetic waves and acoustic waves by said receiver to form a sequence of signals representing the intervals of time between reception of simultaneously transmitted pulses of said electromagnetic waves and acoustic waves;

counting the frequency of individual pulses of said acoustic waves as received by said receiver to form a sequence of signals representing the frequency of individual pulses of said acoustic waves as received;

forming a difference representing the increase of the frequency of individual pulses of said acoustic waves as received with respect to said second frequency to form a sequence of signals representing the increase of the frequency of individual pulses of said acoustic waves as received with respect to said second frequency;

computing a sequence of values of the amount of time until said transmitter and said receiver meet, each of said values determined from the relation:

$$T=(t)(s)/(i)$$

wherein T is the value of the amount of time until said transmitter and said receiver meet, t is the interval of time between reception of a simultaneously transmitted pulse of said electromagnetic waves and a pulse of said acoustic waves, s is the frequency of a pulse of said acoustic waves as received, and i is the increase of the frequency of a pulse said of acoustic waves as received with respect to said second frequency, to form a sequence of signals representing a sequence of values of the amount of time until said transmitter and said receiver meet; and displaying the sequence of values of amount of time until said transmitter and said receiver meet.

12. The method of claim 11 wherein the step of receiving pulses of said electromagnetic and said acoustic waves at said receiver comprises the steps of:

converting received electromagnetic waves to form an analogous first output signal;

processing said first output signal to form a sequence of first timing signals in response to frequency equivalence of said first output signal to said first frequency, said first timing signals representing the times of reception of individual pulses of said electromagnetic waves;

transducing received acoustic waves to form an analogous second output signal; and filtering said second output signal by rejecting all frequencies outside of a band including said second frequency to form a sequence of frequency counting signals and to form a sequence of second timing signals representing the times of reception of individual pulses of said acoustic waves.

13. The method of claim 11 or claim 12, further comprising the step of producing a warning signal essentially simultaneously with displaying the first of the sequence of values of the amount of time until said transmitter and said receiver meet.

14. Approaching vehicle informing receiver for receiving a pulse of electromagnetic waves of a first frequency and a pulse of acoustic waves of a second frequency simultaneously transmitted from a remotely located source and for determining the amount of time until said source and said receiver meet, comprising:

reception means for reception of said pulses of electromagnetic waves and acoustic waves;

timing means responsive to said reception means for measuring the interval of time between reception of said pulse of electromagnetic waves and said pulse of acoustic waves by said reception means and for generating an output signal representing said interval of time between reception of said pulse of electromagnetic waves and said pulse of acoustic waves;

counting means responsive to said reception means for measuring the frequency of said pulse of acoustic waves as received by said reception means and for generating an output signal representing the frequency of said pulse of acoustic waves as received;

comparing means responsive to the output signal of said counting means for measuring the increase of the frequency of said pulse of acoustic waves as received with respect to said second frequency and for generating an output signal representing the increase of the frequency of said pulse of acoustic waves as received with respect to said second frequency;

computing means responsive to the output signals of said timing means, said counting means and said comparing means for computing the amount of time until said source and said receiver meet from the relation:

$$T=(t)(s)/(i)$$

wherein T is the amount of time until said source and said receiver meet, t is the interval of time between reception of said pulse of electromagnetic waves and said pulse of acoustic waves, s is the frequency of said pulse of acoustic waves as received, and i is the increase of the frequency of said pulse of acoustic waves as received with respect to said second frequency, and for generating an output signal representing the amount of time until said source and said receiver meet;

alarm means responsive to the output signal of said computing means for producing a warning signal; and display means responsive to the output signal of said computing means for producing a visual display of the amount of time until said source and said receiver meet.

15. Approaching vehicle informing receiver for receiving a sequence of short pulses of electromagnetic waves of a first frequency and acoustic waves of a second frequency transmitted simultaneously from a remotely located source and for determining the amount of time until said source and said receiver meet, comprising:

reception means for reception of pulses of said electromagnetic waves and acoustic waves;

timing means responsive to said reception means for measuring the intervals of time between reception of the simultaneously transmitted pulses of said electromagnetic waves and acoustic waves by said reception means and for generating a sequence of output signals representing said intervals of time between reception of the simultaneously transmitted pulses of said electromagnetic waves and acoustic waves;

counting means responsive to said reception means for measuring the frequency of individual pulses of said acoustic waves as received by said reception means and for generating a sequence of output signals representing the frequency of individual pulses of said acoustic waves as received;

comparing means responsive to the sequence of output signals of said counting means for measuring the increase of the frequency of individual pulses of said acoustic waves as received with respect to said second frequency and for generating a sequence of output signals representing the increase of the frequency of individual pulses of said acoustic waves as received with respect to said second frequency;

computing means responsive to the sequences of output signals of said timing means, said counting means and said comparing means, for computing a sequence of values of the amount of time until said source and said receiver meet, each of said values determined from the relation:

$$T=(t)(s)/(i)$$

wherein T is the value of the amount of time until said source and said receiver meet, t is the interval of time between reception of a simultaneously transmitted pulse of said electromagnetic waves and a pulse of said acoustic waves, s is the frequency of a pulse of said acoustic waves as received, and i is the increase of the frequency of a pulse of said acoustic waves as received with respect to said second frequency, and for generating a sequence of output signals representing a sequence of values of the amount of time until said source and said receiver meet;

alarm means responsive to the first of the sequence of output signals of said computing means for producing a warning signal; and display means responsive to the sequence of output signals of said computing means for producing a visual display of the sequence of values of the amount of time until said source and said receiver meet.

16. Approaching vehicle informing system as defined in claim 14 or claim 15, wherein said reception means comprises:

radio means for reception of electromagnetic waves and for generating an analogous output signal;

first decoding means for generating to said timing means a first timing signal, in response to frequency equivalence of said output signal of said radio means to said first frequency;

second decoding means for generating to said timing means a second timing signal, in response to a signal near said second frequency;

transducing means for receiving acoustic waves and for generating an analogous output signal; and filtering means responsive to the output signal of said transducing means for rejecting all frequencies outside of a band including said second frequency, and for generating an output signal to said counting means and an output signal to said second decoding means.

* * * * *